(12) United States Patent
Amsterdam et al.

(10) Patent No.: US 8,855,467 B2
(45) Date of Patent: *Oct. 7, 2014

(54) CONTENT RECORDER MULTI-ANGLE VIEWING AND PLAYBACK

(75) Inventors: Jeffrey Amsterdam, Marietta, GA (US); Kulvir S. Bhogal, Fort Worth, TX (US); Gregory Boss, Saginaw, MI (US); Rick Hamilton, II, Charlottesville, VA (US); Brian O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/559,055

(22) Filed: Jul. 26, 2012

(65) Prior Publication Data

US 2012/0297407 A1    Nov. 22, 2012

Related U.S. Application Data

(63) Continuation of application No. 12/418,736, filed on Apr. 6, 2009, now Pat. No. 8,280,226.

(51) Int. Cl.
| | |
|---|---|
| *H04N 21/24* | (2011.01) |
| *H04N 21/472* | (2011.01) |
| *H04N 21/41* | (2011.01) |
| *H04N 5/781* | (2006.01) |
| *H04N 5/782* | (2006.01) |
| *H04N 5/445* | (2011.01) |
| *H04N 21/218* | (2011.01) |
| *H04N 5/50* | (2006.01) |
| *H04N 21/434* | (2011.01) |
| *H04N 21/475* | (2011.01) |
| *H04N 21/658* | (2011.01) |
| *H04N 21/432* | (2011.01) |
| *H04N 21/482* | (2011.01) |
| *H04N 21/258* | (2011.01) |

(52) U.S. Cl.
CPC ........... *H04N 5/50* (2013.01); *H04N 21/47214* (2013.01); *H04N 21/4135* (2013.01); *H04N 5/781* (2013.01); *H04N 5/782* (2013.01); *H04N 5/44543* (2013.01); *H04N 21/21805* (2013.01); *H04N 21/4347* (2013.01); *H04N 21/4758* (2013.01); *H04N 21/6582* (2013.01); *H04N 21/4325* (2013.01); *H04N 21/482* (2013.01); *H04N 21/25891* (2013.01)
USPC .................................. 386/239; 725/9; 725/87

(58) Field of Classification Search
USPC .................................. 386/236; 725/133, 138
See application file for complete search history.

(56) References Cited

U.S. PATENT DOCUMENTS 5,600,368 A    2/1997  Matthews, III
5,894,320 A *  4/1999  Vancelette .................... 725/138
(Continued)

*Primary Examiner* — Carl Colin
*Assistant Examiner* — Ali Shayanfar
(74) *Attorney, Agent, or Firm* — Nicholas L. Cadmus; Mark C. Vallone

(57) ABSTRACT

A method, system, and computer program product for selecting, in real time, a leading view of a multi-angle television program. A video recorder receives a program view selection. The video recorder then transmits a viewer data request for the currently selected program view to a service provider. The video recorder may then receive requested viewer data of the selected program view and one or more alternate views of the selected program. The video recorder may then determine if the selected program view is the leading view of the selected program. When the selected view is not the leading view and the video recorder is configured for automatic view switching, the video recorder may autonomously switch to the leading view of the selected program. Alternatively, the video recorder may present vote totals of all views of the selected program and enable a selection of a desired alternate view.

6 Claims, 5 Drawing Sheets

(56) References Cited

U.S. PATENT DOCUMENTS

| | | |
|---|---|---|
| 6,741,250 B1 | 5/2004 | Furlan et al. |
| 6,816,205 B2 | 11/2004 | Dudkowski |
| 2004/0133906 A1* | 7/2004 | Przybylek ................... 725/9 |
| 2005/0223409 A1* | 10/2005 | Rautila et al. ............... 725/113 |
| 2006/0136977 A1* | 6/2006 | Henry ........................ 725/133 |
| 2007/0136751 A1* | 6/2007 | Garbow et al. ............... 725/46 |
| 2010/0254670 A1 | 10/2010 | Amsterdam et al. |

* cited by examiner

CONTENT RECORDER MULTI-ANGLE VIEWING AND PLAYBACK

CROSS REFERENCE TO RELATED APPLICATION

This application is a Continuation of application Ser. No. 12/418,736 filed Apr. 6, 2009 and now U.S. Published Patent Application No. 2010-0254670 A1.

BACKGROUND OF THE INVENTION

1. Technical Field

The present invention relates in general to video/multimedia recording and viewing systems, and in particular to content recorders. Still more particularly, the present invention relates to a system for viewing and recording of programming on a content recorder.

2. Description of the Related Art

A video recorder is a device that records video in a digital format to a storage medium. This includes stand-alone set-top boxes and software for personal computers which enables video capture and playback to and from storage. Video recorders provide several enhancements over similar devices, such as VCRs, including convenient "time shifting". Additionally, a Personal Video Recorder or Digital Video Recorder (DVR/PVR) enables trick modes such as pausing live TV, instant replay of interesting scenes, chasing playback, and skipping advertisements, etc.

Recently, broadcasters have made available multiple channels for single sporting events. Each channel may provide a different viewing angle and/or commentary for viewing the event. While having multiple channels for a single event is beneficial for the customer, the customer may not know that a better or more desirable angle is available on a different channel. Certain video recorders may be used to concurrently record programming on multiple channels, but such recording consumes vast quantities of storage. Additionally, reviewing multiple recorded channels for a single event by manually switching between multiple views of a program may be cumbersome to a customer. Video recorders are able to record multiple channels of a same program simultaneously, but are unable to display a most desirable program view to a customer without a customer actively selecting a specific channel recording.

SUMMARY OF THE INVENTION

Disclosed are a method, system, and computer program product for selecting, in real time, a leading view of a multi-angle television program. A content recorder receives a program view (e.g. a channel) selection. The content recorder then transmits a viewer data request for the currently selected program view to a service provider. The content recorder may then receive requested viewer data of the selected program containing information of the currently selected view and one or more alternate views of the selected program. The content recorder may then determine if the selected program view is the leading view of the selected program. When the selected view is not the leading view and the content recorder is configured for automatic view switching, the content recorder may autonomously switch to the leading view of the selected program. Alternatively, the content recorder may present vote totals of all views of the selected program and enable a selection of a desired alternate view.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for multi-angle viewing and recording of television programming on a video recorder, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

As illustrated and described herein, content recorder 102 may be a Digital Video Recorder (DVR) or Personal Video Recorder (PVR) having the required hardware components and programmed with functional logic executing on the processor to provide the functionality of the invention.

Figure 1:
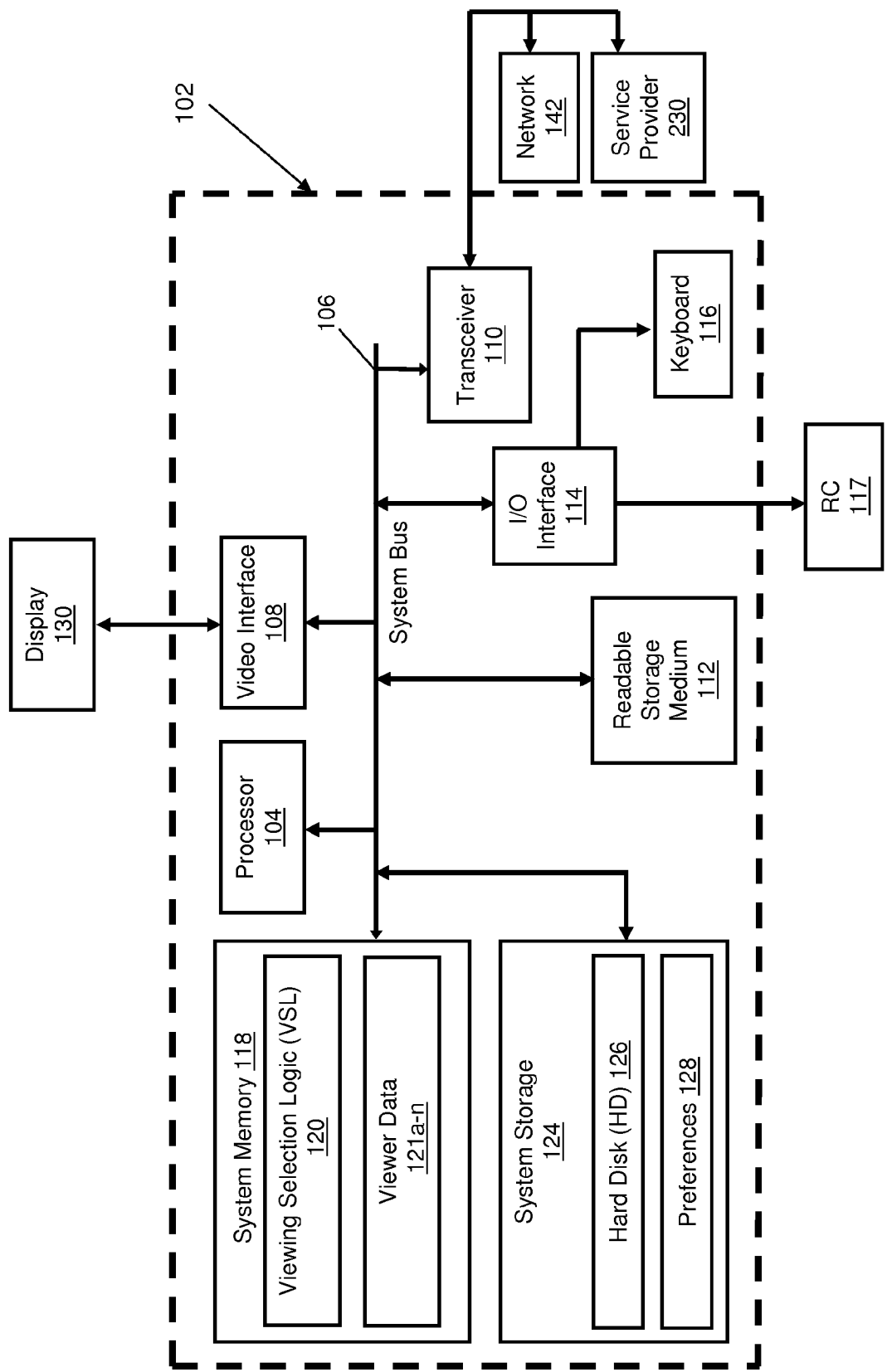
FIG. 1 is a block diagram of a content recorder in which the present invention may be implemented.

With reference now to FIG. 1, there is depicted a block diagram of a computer 102 in which the present invention may be implemented. For simplicity the illustrative embodiments are described as features of a content recorder content recorder such as a Digital Video Recorder (DVR). Content recorder 102 includes a processor 104 that is coupled to a system bus 106. A transceiver 110, connected to system bus 106, enables video recorder 102 to connect to network 142 and Service Provider 230, via wired or wireless mechanisms. Video Interface 108, coupled to system bus 106, allows for the connection of a Display 130 to content recorder 102 enabling viewing of television programming and a general user interface (including text and graphics) for use by a user of content recorder 102. System bus 106 also affords communication with a hardware-based readable storage medium 112 (e.g., Compact Disk-Read Only Memory (CD-ROM), flash drive memory, etc). Input/Output (I/O) Interface 114, also connected to system bus 106, permits user interaction with content recorder 102, such as data entry via keyboard 116 or Remote Control (RC) 117. RC 117 may connect to content recorder 102 via a wireless connection.

Content recorder 102 also comprises a system storage 124, which is connected to system bus 106. System Storage 124 comprises a hard disk 126 in which is stored preferences 128. Preferences 128 may contain user defined preferences and settings for recording, viewing, scheduling, and playback of television content.

Content recorder 102 also comprises system memory 118, which is connected to system bus 106. As shown, system memory 118 comprises viewing selection logic (VSL) 120 which determines the most popular or best view of a program. VSL 120 includes code for implementing the processes described in FIGS. 2-5. In one embodiment, content recorder 102 is able to utilize VSL 120 to autonomously select a program view or combination of program views and display the views on Display 130 or record the program views to Hard Disk 126 for future playback, as described in greater detail below in FIGS. 2-5.

The hardware elements depicted in content recorder 102 are not intended to be exhaustive, but rather are representative of essential components required by and/or utilized to implement the present invention. Alternate configurations of components and other variations are intended to be within the spirit and scope of the present invention.

Figure 2:
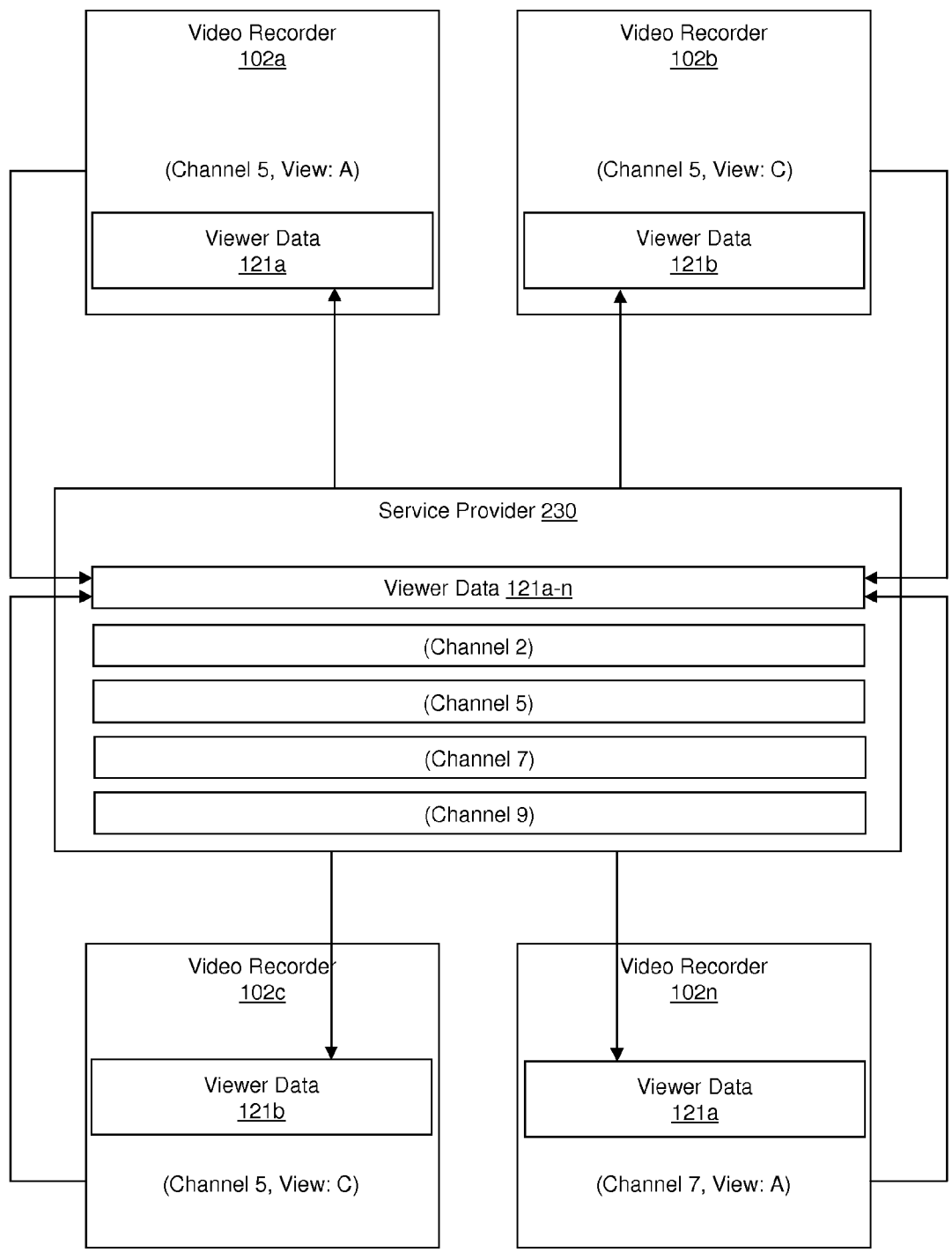
FIG. 2 is a block diagram of an exemplary system for multi-angle viewing and recording of television programming on a content recorder.

With reference now to FIG. 2, there is illustrated an exemplary system for multi-angle viewing and recording of television programming on a content recorder, in accordance with one embodiment of the invention. The illustrative embodiment is described from the perspective of content recorder 102 receiving a program view selection and subsequently requesting and receiving viewer data of the selected program from a service provider 230. A program view is a displayed view of a selected program (e.g., a television channel). Upon receiving this initial program selection, content recorder 102 tunes to the selected program. Content recorder 102 may then request viewer data 231a-n corresponding to the selected program. Viewer data 231 contains voting information of each view of the selected program. Content recorder 102 determines, from the received viewer data, a most popular view, or leading view, of the selected program. The leading view is the most popular view as determined by votes received by service provider 230 from content recorder 102a-n. When configured for automatic changing to a leading view, content recorder 102 autonomously changes the presented view on a display (e.g., Display 130) to the leading program view in real time. In this embodiment, content recorder 102 dynamically changes between program views so that the leading program view is always being displayed, or recorded by content recorder 102. Accordingly, over the duration of a program, content from several different program views may be displayed, where the leading view being the displayed view. Content recorder 102 adjusts, in real time, to a changing leading program view, and displays only the leading program view at each particular point in time on a connected display (e.g., Display 130, FIG. 1). In an alternate embodiment, service operator 230 may force the display of a specific program view to content recorder 102.

Content recorder 102 may also contain preferences (e.g., Preferences 128, FIG. 1) for viewing, recording, and playing back previously recorded programming. In these preferences a user may establish settings such as automatic switching to a leading program view, recording quality, and recording multiple views of a same program. Preferences may also establish rules for autonomously voting for program views.

Content recorder 102 may also manually prompt a user for a vote of a currently selected program view. Votes may be manually tendered by a user by using a device such as a remote control (e.g., Remote Control 117, FIG. 1). In response to receiving a selected a program view, content recorder 102 may tender a vote for the selected program view. In an alternate embodiment, content recorder 102 may also automatically vote for a currently selected program view after displaying that particular program view for a specified amount of time (e.g., 10 minutes). Votes received by service provider 230 from content recorders 102a-n are compiled into viewer data 121a-n which may be periodically accessed by content recorders 102a-n. In this manner, the more votes received by service provider 230, the more accurate and enjoyable the autonomously selected program views will be for users of content recorders 102a-n.

Content recorder 102 may record only a leading view of a selected program. Alternatively content recorder 102 may record multiple views of a selected program. Recording multiple views of a selected program enables a user to watch several different views at each point in a given program. For example, content recorder 102 may contain functionality to allow a viewer to record each in-car dash-cam of a participant's car in a NASCAR race. In an alternate embodiment, content recorder 102 may record only the leading view of a program at a given point in time of a program broadcast. In this manner, a single recording is created, however, the actual recording may be dynamically switching between multiple program views over the duration of the recording. Using the above example, a recording is created where the view presented to the user always contains the lead car of a NASCAR race.

Figure 3:
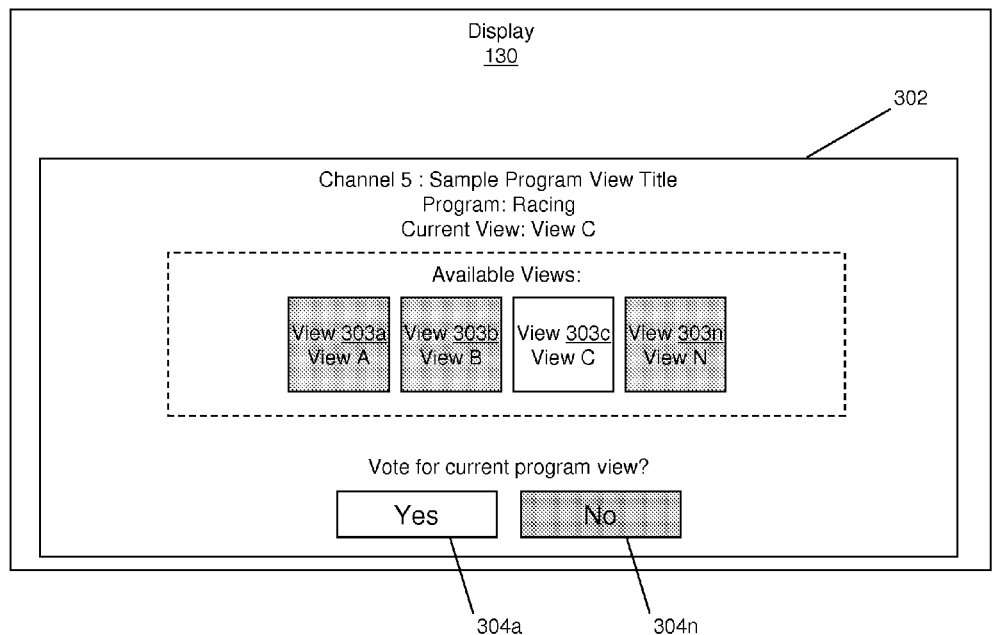
FIG. 3 is a diagram of an exemplary user interface of a multi-angle viewing and recording system of a content recorder.

With reference now to FIG. 3, there is illustrated an exemplary user interface of a multi-angle viewing and recording system of a content recorder. In this illustration a display overlay 302 may be presented on a display (e.g., Display 130, FIG. 1) connected to content recorder 102. The display overlay 302 may display relevant program view information (e.g., channel title, program title, currently selected view) and a list of all available views 303a-n of the currently selected program. This enables a user to select an alternate view 303a-n (from among all available program views) as desired. Additionally, display overlay 302 may have a response area with response selection boxes 304a-n to facilitate allowing a user to vote for any program view.

Figure 4:
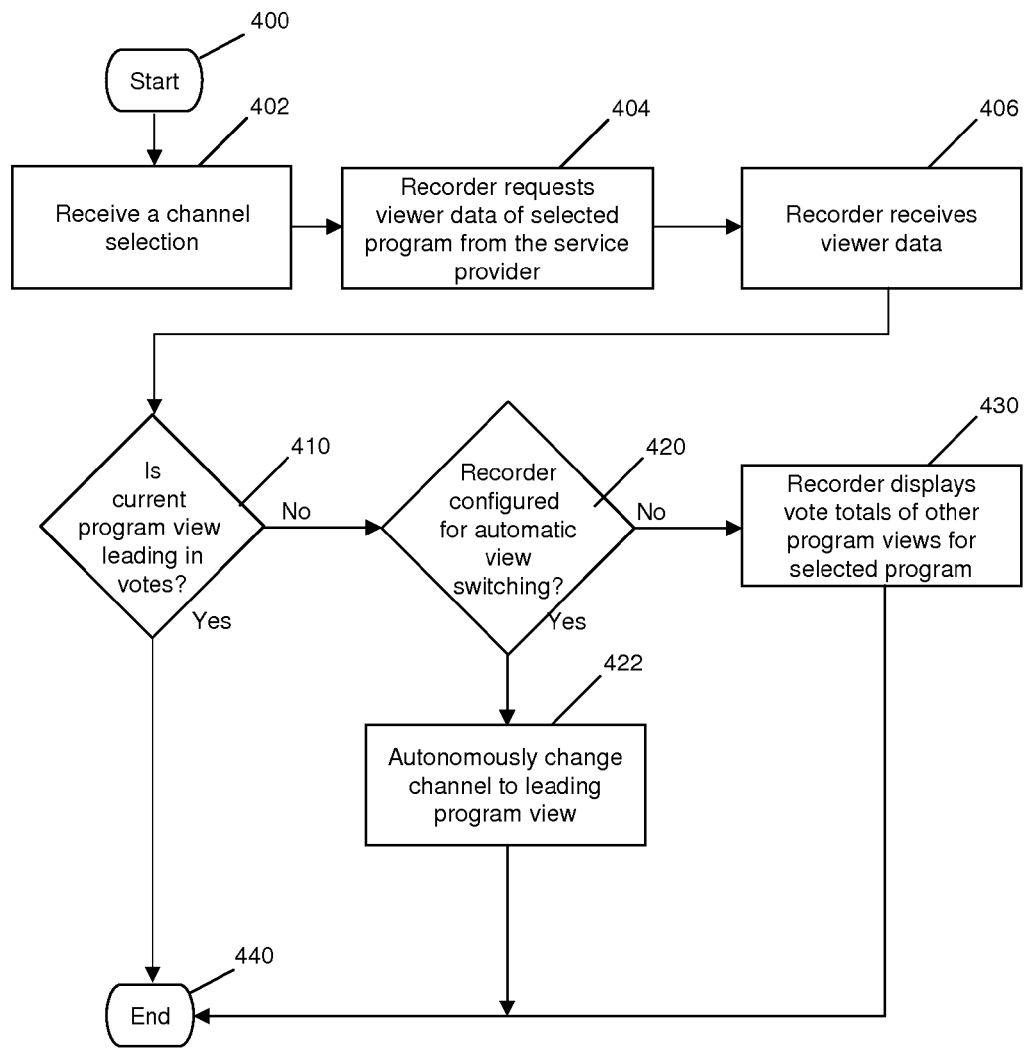
FIG. 4 is a high-level logical flowchart of an exemplary method for switching program views based on vote totals.

With reference now to FIG. 4, there is provided a high-level flow chart of an exemplary method for switching program views based on vote totals. Following initiator block 400, a content recorder receives a program view selection from a user and tunes to the selected program view (block 402). In block 404 the content recorder requests viewer data containing information of alternate program views for the currently selected program from the service provider. In response to receiving the viewer data (block 406), the content recorder then determines if the currently selected program view is leading in votes (block 410). When the currently selected program view is leading in votes the process terminates (block 440).

If the currently selected program view is not leading in votes, the content recorder reads the internally stored preferences to determine if the content recorder is configured for automatic program view changing to the leading program view (block 420). If the content recorder is configured for automatic program view changing, the current program view is automatically changed to the leading program view (block 422). If the content recorder is not configured for automatic program view changing, the content recorder may display an overlay indicating available alternate program views and popularity ratings for each alternate program view (block 430). The process then terminates (block 440).

Figure 5:
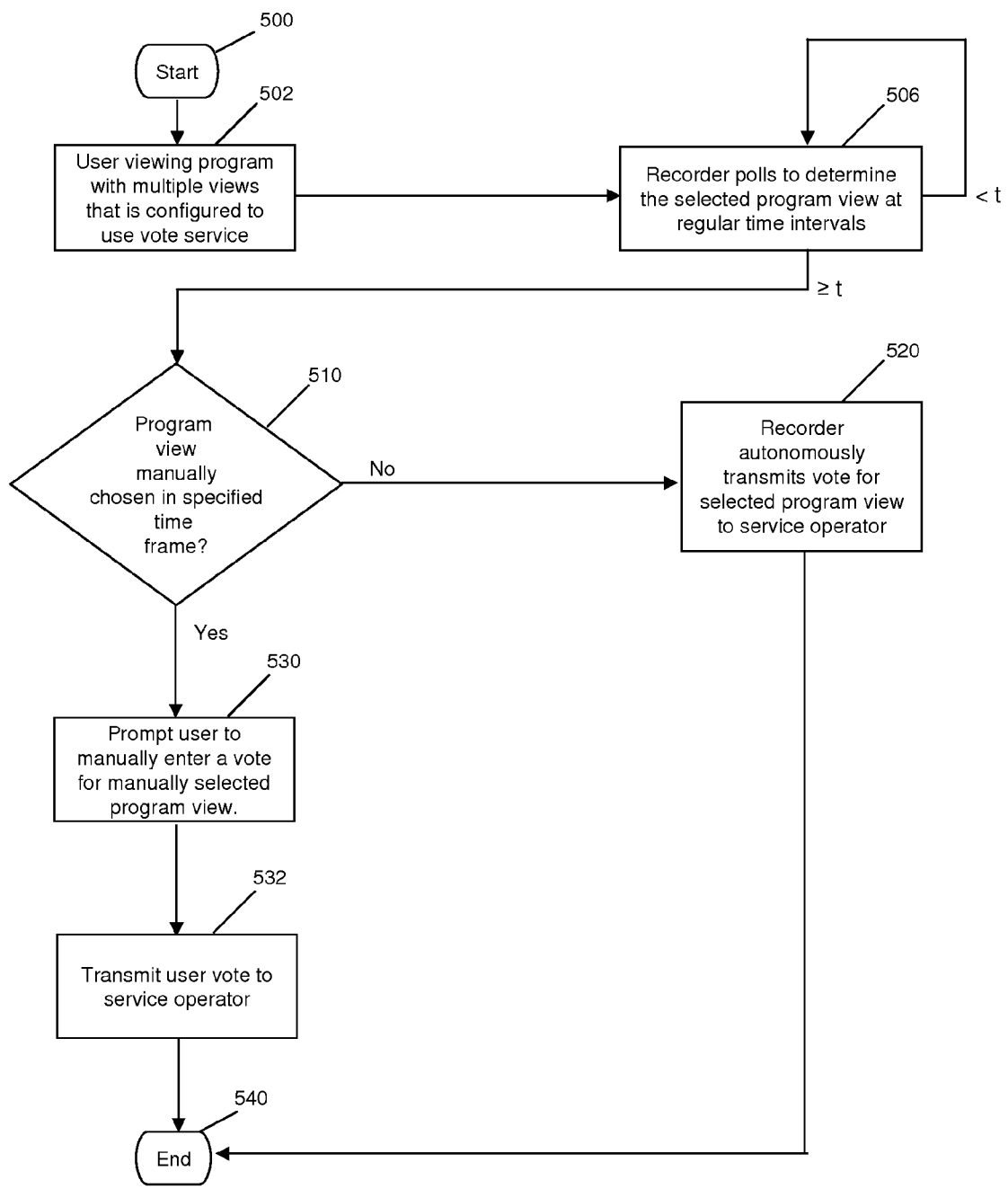
FIG. 5 is a high-level logical flowchart of an exemplary method for manually and autonomously voting for a program view.

With reference now to FIG. 5, there is provided a high-level logical flowchart of an exemplary method for manually and autonomously voting for a program view. Following initiator block 500, a content recorder determines that a user is viewing a program with multiple views and that the content recorder is configured to use the vote service (block 502). The content recorder may then query, at regular time intervals, to determine the currently selected program view (block 506). At each poll time interval the content recorder determines if the currently selected program view has been manually chosen since the last poll interval (block 510). When the currently selected program view has not been manually chosen since the last interval, content recorder may autonomously submit a vote for the selected program view to the service operator (block 520). The process then terminates (block 540).

When the currently selected program view has been manually chosen since the last poll interval, and no automatic view switching is established within the content recorder, the content recorder may prompt a user to manually tender a vote for the currently selected program view (block 530). Upon a user tendering a vote, the content recorder transmits the vote to the service provider (block 532). The service provider updates the viewer data for the particular program to reflect the additional vote. The process then terminates (block 540).

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of storage devices, which include, without limitation, non-writable storage devices (e.g. CD-ROM) and writable storage (e.g. network attached storages, hard disk drive, read/write CD-ROM, optical devices). It should be understood, therefore, that such storage devices, when encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for tuning a digital video recorder (DVR), the method comprising the steps of:

a DVR receiving a user selection of a program being simultaneously broadcasted by a content provider on a plurality of channels, wherein each channel of the plurality of channels provides viewers of the channel with a viewing angle of the program that is unique among viewing angles of the program provided to viewers of each other channel in the plurality of channels;

the DVR receiving popularity data about the program from the content provider, wherein the popularity data indicates a popularity of the viewing angle provided on each channel of the plurality of channels among viewers of the channel;

the DVR determining, from the popularity data, a most popular viewing angle of the program among the viewing angles provided on the plurality of channels;

the DVR tuning to a channel of the plurality of channels providing the most popular viewing angle; and the DVR repeating the receiving popularity data, the determining, and the tuning steps such that at each point in time of the program occurring after a performance of the tuning step, the DVR is tuned to a current most popular viewing angle of the program at that point in time.

2. The method of claim 1, further comprising the step of:

after the tuning step, the DVR causing a display device connected to the DVR to display the most popular viewing angle of the program.

3. A computer program product comprising a computer readable tangible storage device and program instructions stored on the computer readable tangible storage device, the program instructions, when carried out by a processor of a digital video recorder (DVR), implement a method for tuning the DVR, the method comprising the steps of:

the DVR receiving a user selection of a program being simultaneously broadcasted by a content provider on a plurality of channels, wherein each channel of the plurality of channels provides viewers of the channel with a viewing angle of the program that is unique among viewing angles of the program provided to viewers of each other channel in the plurality of channels;

the DVR receiving popularity data about the program from the content provider, wherein the popularity data indicates a popularity of the viewing angle provided on each channel of the plurality of channels among viewers of the channel;

the DVR determining, from the popularity data, a most popular viewing angle of the program among the viewing angles provided on the plurality of channels;

the DVR tuning to a channel of the plurality of channels providing the most popular viewing angle; and the DVR repeating the receiving popularity data, the determining, and the tuning steps such that at each point in time of the program occurring after a performance of the tuning step, the DVR is tuned to a current most popular viewing angle of the program at that point in time.

4. The computer program product of claim 3, wherein the method further comprises the step of:

after the tuning step, the DVR causing a display device connected to the DVR to display the most popular viewing angle of the program.

5. A digital video recorder (DVR) comprising a processor and a computer readable tangible storage device, the computer readable tangible storage device storing program instructions that, when carried out by the processor, implement a method for tuning the DVR, the method comprising the steps of:

the DVR receiving a user selection of a program being simultaneously broadcasted by a content provider on a plurality of channels, wherein each channel of the plurality of channels provides viewers of the channel with a viewing angle of the program that is unique among viewing angles of the program provided to viewers of each other channel in the plurality of channels;

the DVR receiving popularity data about the program from the content provider, wherein the popularity data indicates a popularity of the viewing angle provided on each channel of the plurality of channels among viewers of the channel;

the DVR determining, from the popularity data, a most popular viewing angle of the program among the viewing angles provided on the plurality of channels;

the DVR tuning to a channel of the plurality of channels providing the most popular viewing angle; and the DVR repeating the receiving popularity data, the determining, and the tuning steps such that at each point in time of the program occurring after a performance of the tuning step, the DVR is tuned to a current most popular viewing angle of the program at that point in time.

6. The DVR of claim 5, wherein the method further comprises the step of:

after the tuning step, the DVR causing a display device connected to the DVR to display the most popular viewing angle of the program.

\* \* \* \* \*